US010611236B2

(12) United States Patent
Kreiling et al.

(10) Patent No.: US 10,611,236 B2
(45) Date of Patent: Apr. 7, 2020

(54) WORK VEHICLE FUEL ANTI-THEFT SYSTEM

(71) Applicant: Deere & Company, Moline, IL (US)

(72) Inventors: Jeffery R. Kreiling, Dubuque, IA (US);
David J. Rulseh, Dickeyville, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/108,138

(22) Filed: Aug. 22, 2018

(65) Prior Publication Data

US 2020/0062110 A1 Feb. 27, 2020

(51) Int. Cl.
*B60K 15/03* (2006.01)

(52) U.S. Cl.
CPC .... *B60K 15/03* (2013.01); *B60K 2015/03217* (2013.01); *B60K 2015/03375* (2013.01); *B60K 2015/03434* (2013.01)

(58) Field of Classification Search
CPC .......... B60K 15/03; B60K 2015/03375; B60K 2015/03217; B60K 2015/03434
See application file for complete search history.

(56) References Cited

U.S. PATENT DOCUMENTS

| 8,928,473 B2 | 1/2015 | Gilchrist et al. | |
|---|---|---|---|
| 2003/0102976 A1* | 6/2003 | Lavallee | B60K 15/0406 340/687 |
| 2008/0196495 A1* | 8/2008 | Nebbia | B60K 15/04 73/291 |
| 2018/0087948 A1* | 3/2018 | Khandelwal | G01F 23/0076 |

FOREIGN PATENT DOCUMENTS

GB 250167 A 11/2013

* cited by examiner

*Primary Examiner* — Nader Bolourchi

(57) ABSTRACT

A work vehicle includes a fuel tank, a control module, a fuel access detection device, a fuel level sensor, and a reaction assembly. The fuel access detection device detects the accessibility of the fuel, and transmits a first signal indicative of the accessibility of the fuel to the control module. The fuel level sensor detects a volume of the fuel, and transmits a second signal related to the volume of the fuel to the control module. The reaction assembly is coupled to the control module and performs a first reaction and a second reaction after the first reaction. In the first reaction the reaction assembly is commanded by the control module based on the first signal, and in the second reaction the reaction assembly is commanded by the control module based on the second signal when the volume of the fuel is changed.

18 Claims, 6 Drawing Sheets

WORK VEHICLE FUEL ANTI-THEFT SYSTEM

RELATED APPLICATIONS

N/A.

FIELD OF THE DISCLOSURE

The present disclosure relates generally to a fuel anti-theft device for a work vehicle for notifying an operator when fuel is removed.

BACKGROUND OF THE DISCLOSURE

In general, when an operator leaves a work vehicle on a job site fuel theft can be an issue. Without a warning from a fuel anti-theft device, a thief may remove fuel and the operator may only realize fuel was removed after returning to the work vehicle.

SUMMARY OF THE DISCLOSURE

According to an aspect of the present disclosure, a work vehicle includes a fuel tank, a control module, a fuel access detection device, a fuel level sensor, and a reaction assembly. The fuel tank is used for storing a fuel. The fuel access detection device is configured to detect the accessibility of the fuel, and to transmit a first signal indicative of the accessibility of the fuel to the control module. The fuel level sensor is configured to detect a volume of the fuel, and to transmit a second signal related to the volume of the fuel to the control module. The reaction assembly is coupled to the control module and performs a first reaction and a second reaction after the first reaction. In the first reaction the reaction assembly is commanded by the control module based on the first signal, and in the second reaction the reaction assembly is commanded by the control module based on the second signal when the volume of the fuel is changed.

According to an aspect of the present disclosure, a fuel anti-theft system for a work vehicle includes a notifying device. The notifying device is positioned in proximity to an operator or work vehicle owner. The work vehicle is configured to communicate with the notifying device. The work vehicle includes a fuel tank, a control module, a fuel access detection device, a fuel level sensor, and a reaction assembly. The fuel tank is used for storing a fuel. The fuel access detection device is configured to detect the accessibility of the fuel, and to transmit a first signal indicative of the accessibility of the fuel to the control module. The fuel level sensor is configured to detect a volume of the fuel, and to transmit a second signal related to the volume of the fuel to the control module. The reaction assembly is coupled to the control module and configured for performing a first reaction and a second reaction after the first reaction. In the first reaction the reaction assembly is commanded by the control module based on the first signal, and in the second reaction the reaction assembly is commanded by the control module based on the second signal when the volume of the fuel is changed.

According to an aspect of the present disclosure, a method for fuel theft detection and alert for a work vehicle is disclosed. The method includes: detecting an accessibility of fuel in a fuel tank of the work vehicle by a fuel access detection device; receiving a first signal indicative of the accessibility of fuel by a control module when the fuel is accessible; commanding a reaction assembly to perform a first reaction by the control module based on the first signal; detecting a volume of the fuel by a fuel level sensor; receiving a second signal related to the volume of the fuel by the control module; determining the volume of the fuel change based on the second signal; and commanding the reaction assembly to perform a second reaction by the control module when the volume of the fuel is changed.

The disclosure provides a work vehicle and a fuel anti-theft system thereof for recording fuel theft, alerting an operator or owner, and alarming and deterring fuel thief.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

The disclosure relates to a fuel anti-theft system utilized on a work vehicle to notify the vehicle owner and deter the fuel thief. Although the description of the elements is directed to an excavator, the description is equally applicable to a backhoe loader, a skid steer loader, or other vehicles.

Figure 1:
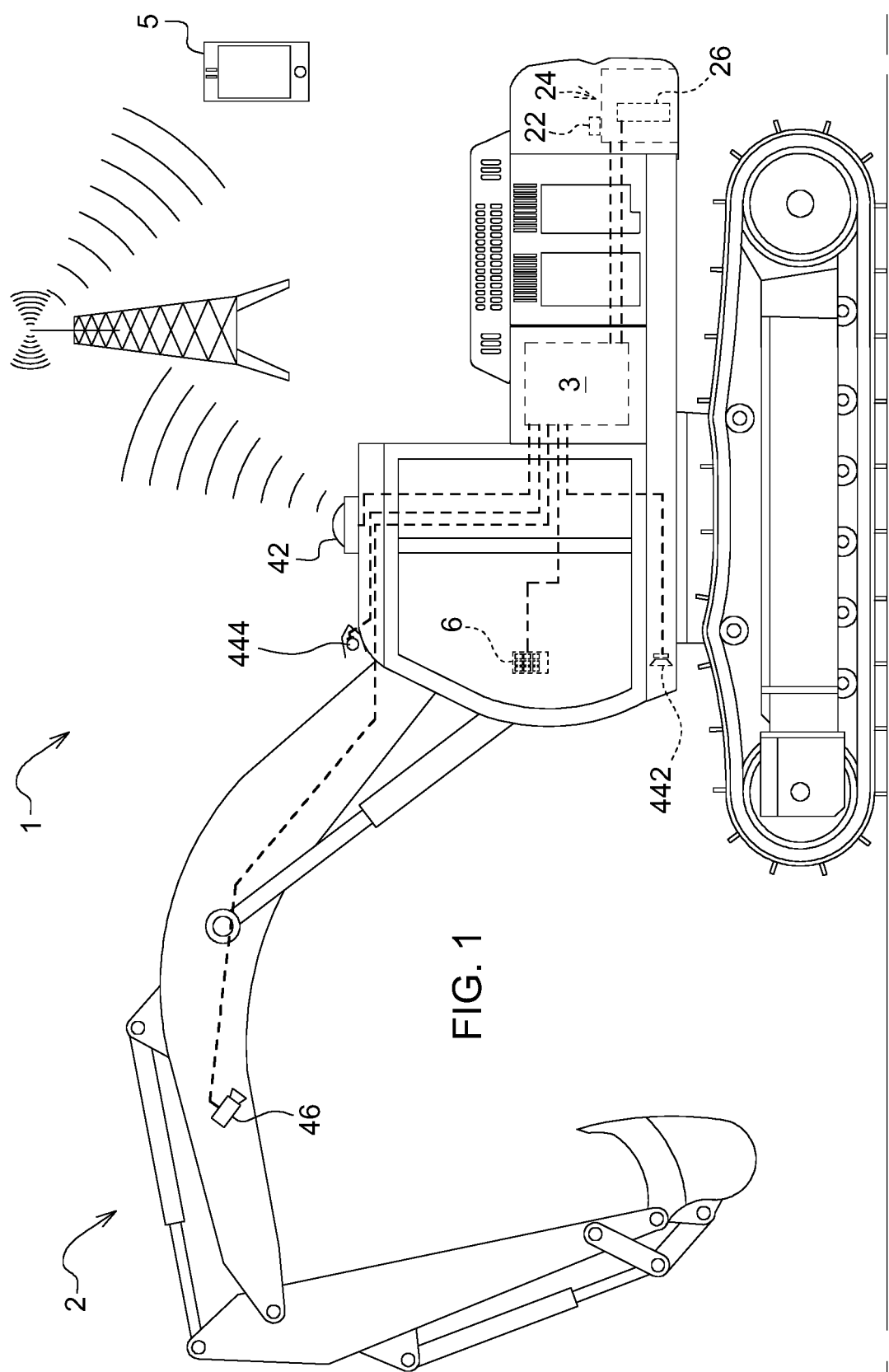
FIG. 1 is a pictorial diagram illustrating a fuel anti-theft system.

Referring to FIG. 1, the fuel anti-theft system 1 includes a work vehicle 2, for example, an excavator, and a notifying device 5 communicating with the work vehicle 2 via an alert module 42, which includes a transceiver. The alert module 42, optionally, can be a component of JDLink™ Telematics. The notifying device 5 is used to notify the vehicle owner of the situation of the work vehicle 2, and can be a handheld device such as a cellphone or a tablet, or a terminal at a remote work station. The work vehicle 2 includes a fuel access detection device 22, a fuel tank 24 positioned in the compartment of the work vehicle 2 for storing a fuel, and a control module 3 for controlling alerting and alarming actions that will be described later. A fuel level sensor 26 is positioned within the fuel tank 24 to detect the volume of the fuel. In this embodiment, the fuel level sensor 26 is a fuel sender. An input device 6 is coupled to the control module 3 and is configured to set up a time frame for normal operation/business time.

The fuel access detection device 22 is configured to detect the accessibility of the fuel, and to transmit a first signal indicative of the accessibility of the fuel to the control module 3. The control module 3 may record the time when it receives the first signal or utilize a timestamp in the first signal to record the time. The accessibility of the fuel may involve at least two situations: (1) a fuel door of the work vehicle 2 is opened; and (2) the fuel cap separates from the opening of the fuel tank 24 or from the hose (fuel filler neck) connected to the fuel tank 24.

For the first situation, the fuel access detection device 22 can be a fuel door switch positioned in proximity to the fuel door. The fuel access detection device 22 in this embodiment may be a resilient pin or piece selectively engaged with the fuel door. When the fuel door is closed, the fuel access detection device 22 is pressed by the fuel door; when the fuel door is open, the fuel access detection device 22 is not engaged with the fuel door. The first signal indicative of the accessibility of the fuel is created during the transition of the fuel door that moves from closed to open. For the second situation, the fuel access detection device 22 can be a sensor such as displacement, vibration, acceleration sensor applied on the fuel cap. When the fuel cap is removed from the opening of the fuel tank 24, the first signal indicative of the accessibility of the fuel is created due to the movement of the fuel cap.

The first and second situations of the accessibility of the fuel presented above are only examples. The fuel access detection device 22 can be either the door switch or sensor on the fuel cap, or both. In case the fuel access detection device 22 includes the door switch and the sensor, the door switch provides a signal notifying the control module 3 that the fuel door is open before the sensor provides a signal notifying the control module 3 that the fuel cap is removed. Alternatively, the fuel access detection device 22 can be positioned on other locations such as the housing of the fuel tank 24 or the inside of the hose connected to the fuel tank 24 to detect the vibration or intrusion caused by a fuel thief.

Figure 2A:
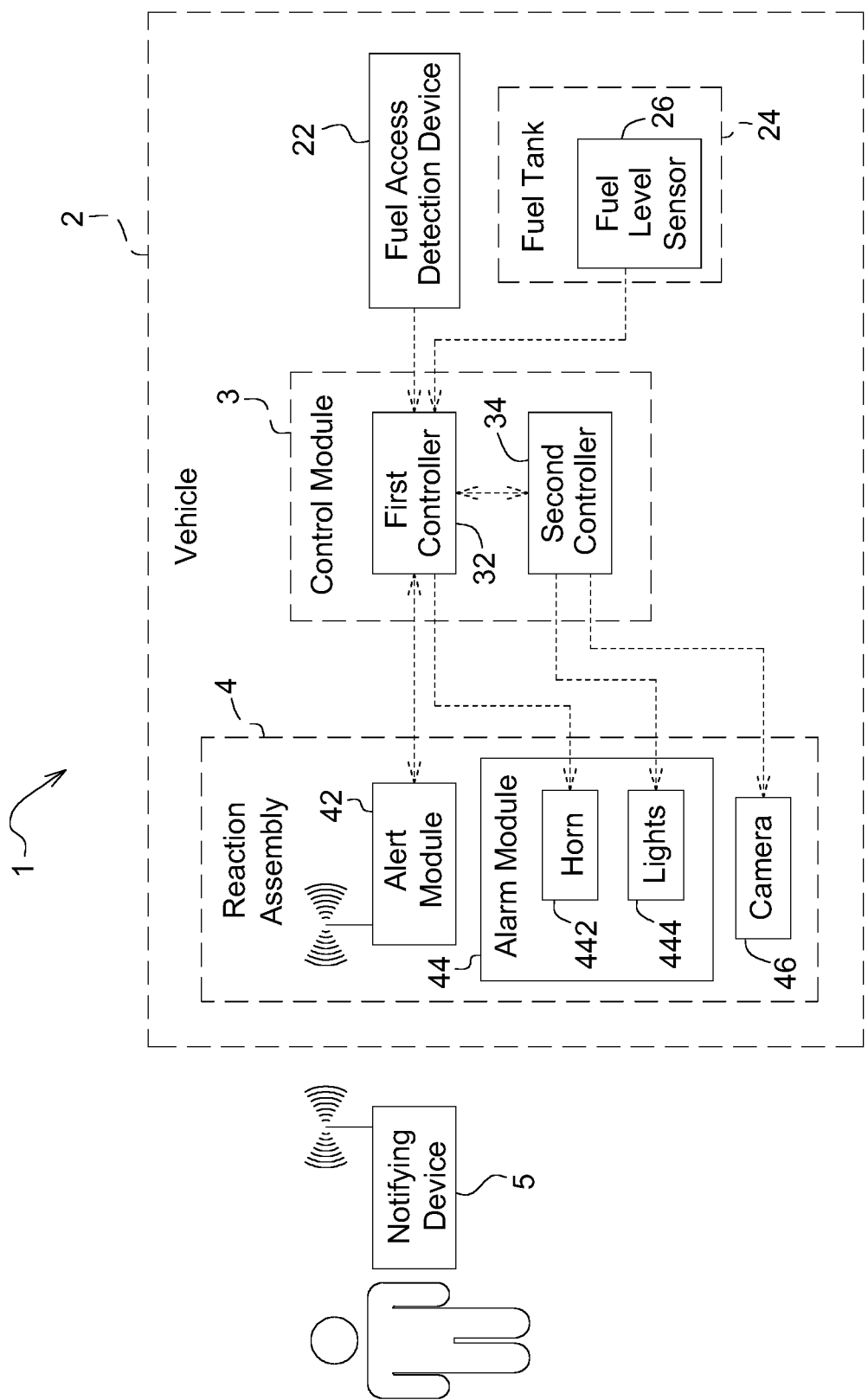
FIG. 2A is a block diagram illustrating the fuel anti-theft system when it is inactive.

FIG. 2A demonstrates the fuel anti-theft system 1 when it is inactive. Dashed line arrows between the elements illustrating two of the elements are capable to communicate with one another but have not transmitted nor received any signal. On the contrary, solid line arrows in FIGS. 2B-2D represent signals that are transmitted from or received by one of the elements.

Referring to FIGS. 1 and 2A, the control module 3 includes a first controller 32 and second controller 34 coupled to the first controller 32. In this embodiment, the first controller 32 is a vehicle controller and the second controller 34 is a cab controller. The work vehicle 2 also includes a reaction assembly 4 performing reactions after receiving controlling signals from the control module 3. The reaction assembly 4 includes the alert module 42, an alarm module 44, and a camera 46. The alarm module 44 includes a horn 442 and lights 444.

Figure 2B:
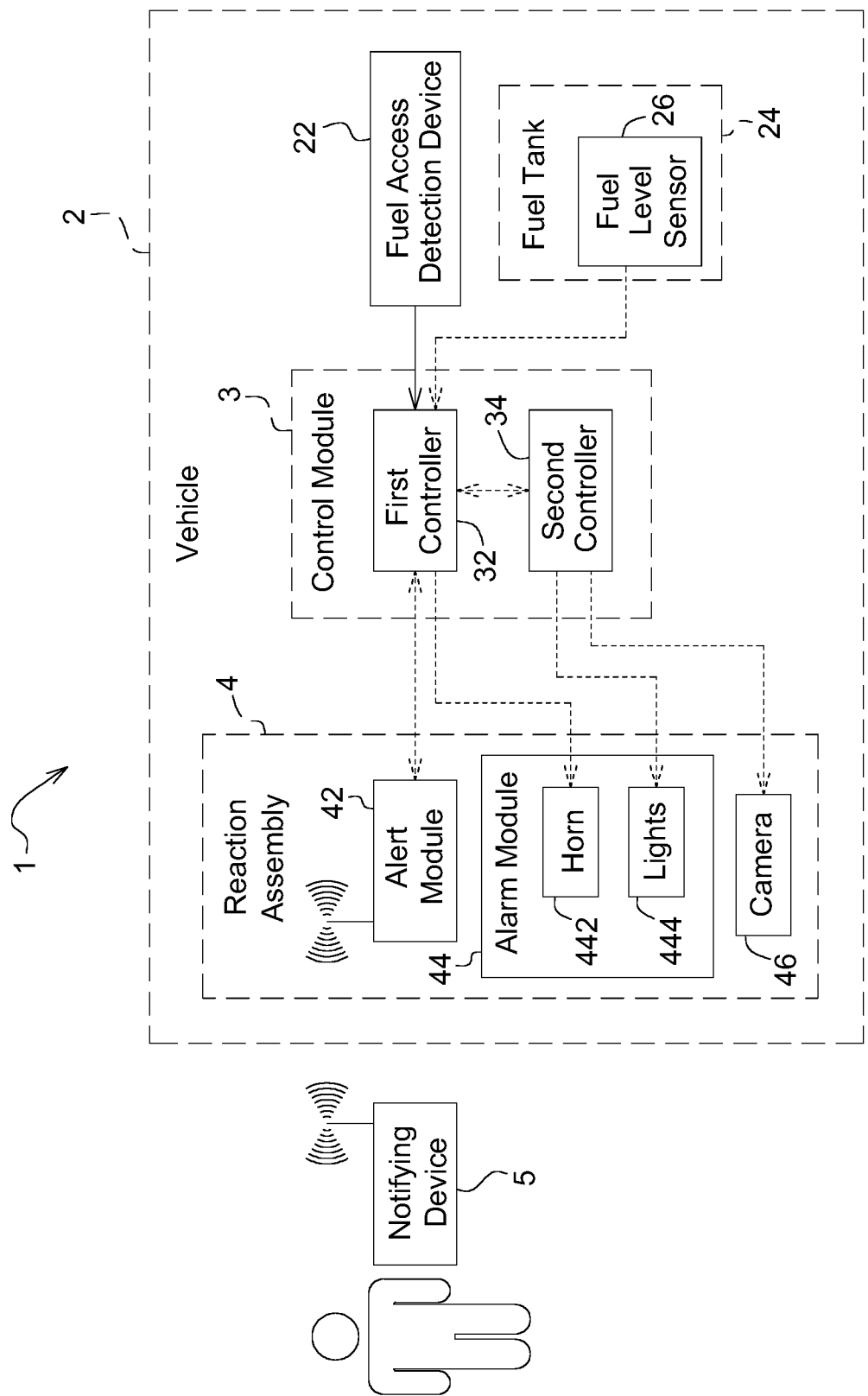
FIG. 2B is a block diagram illustrating the fuel access detection device triggered and transmitting a first signal to wake up the first controller.

Referring to FIG. 2B, the fuel access detection device 22 detects the accessibility of fuel. If the fuel becomes accessible, such as the fuel door is open or the fuel cap is removed, the fuel access detection device 22 transmits the first signal indicative of the accessibility of the fuel to wake up the first controller 32 of the control module 3.

Figure 2C:
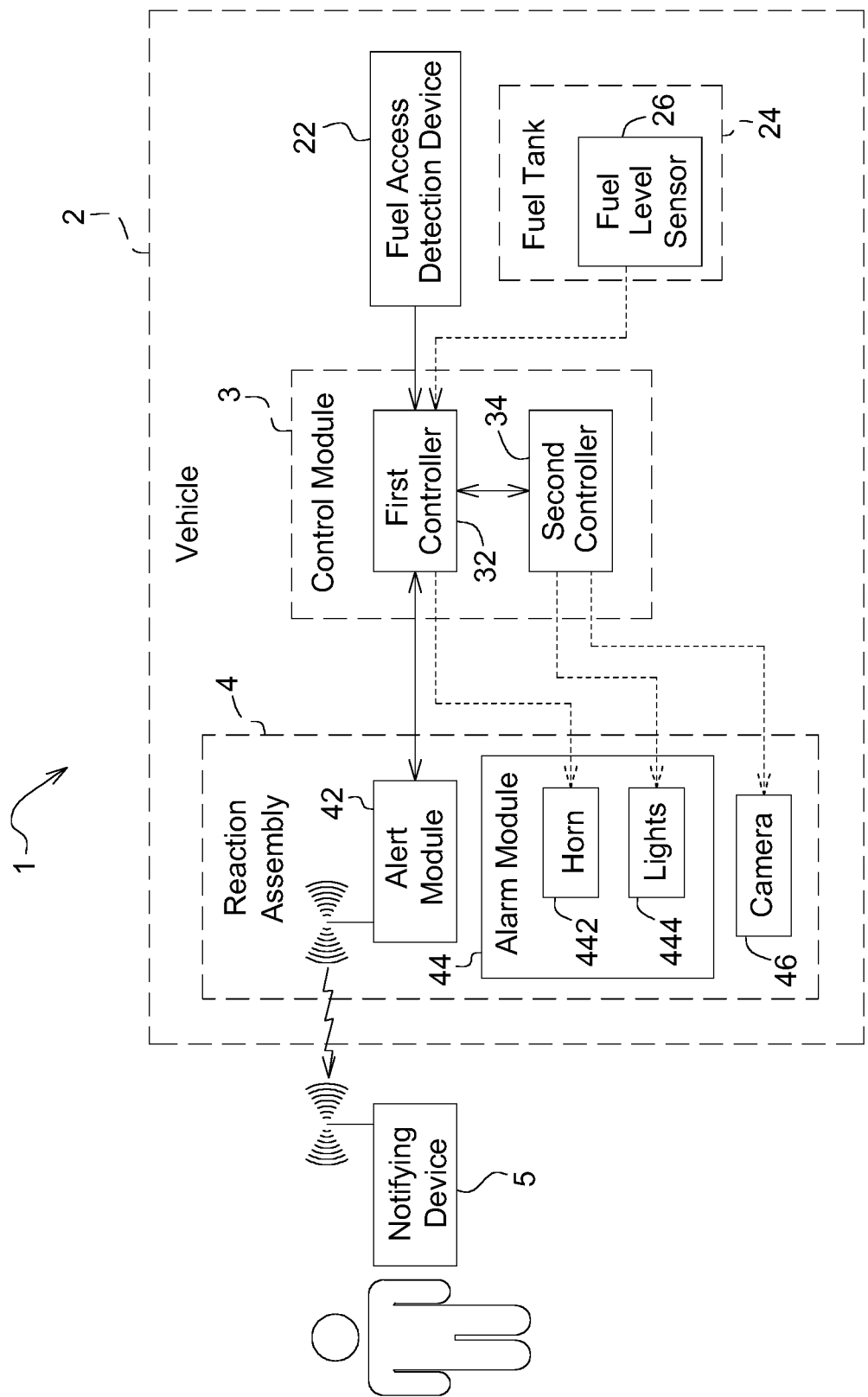
FIG. 2C is a block diagram illustrating that when the fuel access detection device is triggered outside a pre-set time frame, the fuel anti-theft system notifies a work vehicle owner.
Figure 2D:
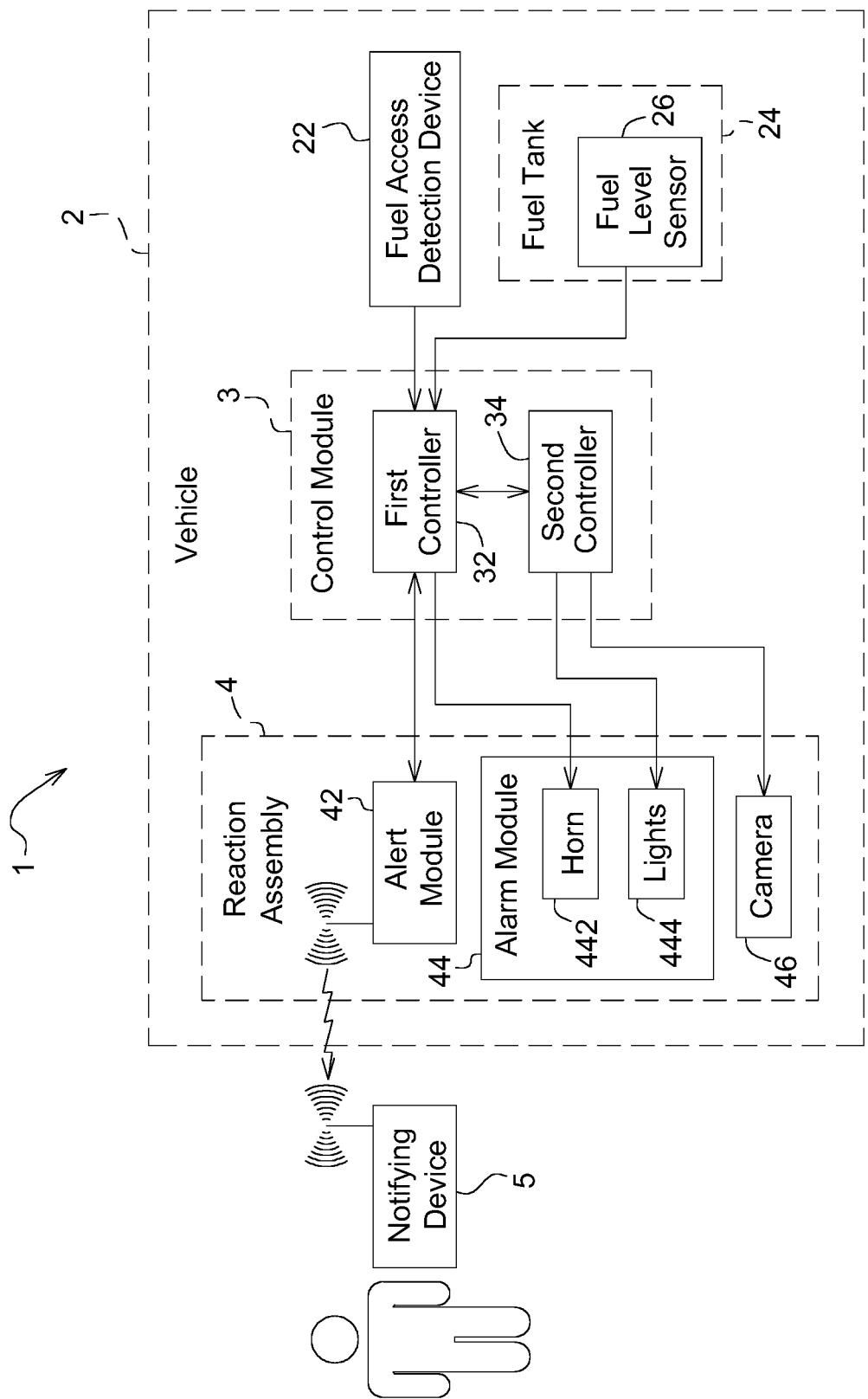
FIG. 2D is a block diagram illustrating that when the volume of the fuel is changed, the fuel anti-theft system notifies the work vehicle owner and deters the fuel thief.

Referring to FIG. 2C, if the first controller 32 receives the first signal outside the time frame that was preset by the owner, the first controller 32 powers the second controller 34 and commands the reaction assembly 4 at least in the first reaction. In this embodiment, the first reaction includes the alert module 42 of the reaction assembly 4 transmitting an alerting signal notifying the owner/user of the vehicle that the fuel is accessible. It is noted that the time frame here represents the normal business/working/operation time. It is possible that the owner/user preset another time frame that represents non-working time (alerting time). However, setting the time frame for working time automatically setting another time frame for non-working time.

Referring to FIG. 2D, during or after the first reaction, the fuel level sensor 26 detects the volume of the fuel and transmits a second signal indicative of the volume of the fuel to the first controller 32. The first controller 32 determines whether the volume of the fuel is changed by comparing the current volume represented by the second signal and previous volume represented by the previous signal. Alternatively, the second signal may only be transmitted to the first controller 32 when volume of the fuel is changed.

Once the first controller 32 determines the volume of the fuel is changed based on the second signal, the reaction assembly 4 performs a second reaction after the first reaction. The second reaction is operated under the control of the control module 3; in this embodiment, in the second reaction the reaction assembly 4 is partially commanded by the first controller 32 and the second controller 34. The second reaction includes the alert module 42 transmitting another alerting signal notifying the owner/user of the work vehicle 2 that the volume of the fuel is changed (reduced when the fuel thief is trying to drain the fuel), and the horn 442 (or reverse alarm) of the alarm module 44, commanded by the first controller 32, providing sound to deter the fuel thief. The second reaction also includes the lights 444 of the alarm module 44, commanded by the second controller 34, providing light to deter the fuel thief.

In addition, the second reaction includes the camera 46, commanded by the second controller 34, recording objects around the work vehicle 2 as a bird's eye image. The thief may be recorded by the camera 46. The camera 46 may be positioned at a relatively high position such as the top of the cabin or the boom of the excavator in this embodiment to record broader area. The camera 46 may be a bird's eye camera.

After at least the first and second reactions, the system may power down.

It is noted that the multiple elements in the reaction assembly 4, including alert module 42, horn 442, lights 444, and camera 46 merely exemplify the first and second reactions. It is possible to include other elements to perform the first and second reactions. It is also possible to exchange the series of the performances of the elements in the first and second reactions, with the controllers commanding at a different time or sequence. In addition, the number of the controllers in this embodiment is merely for example. The control module 3 may only have one controller or may have more than two controllers commanding the elements in the reaction assembly 4 at different time or at least some of the elements at the same time.

Figure 3:
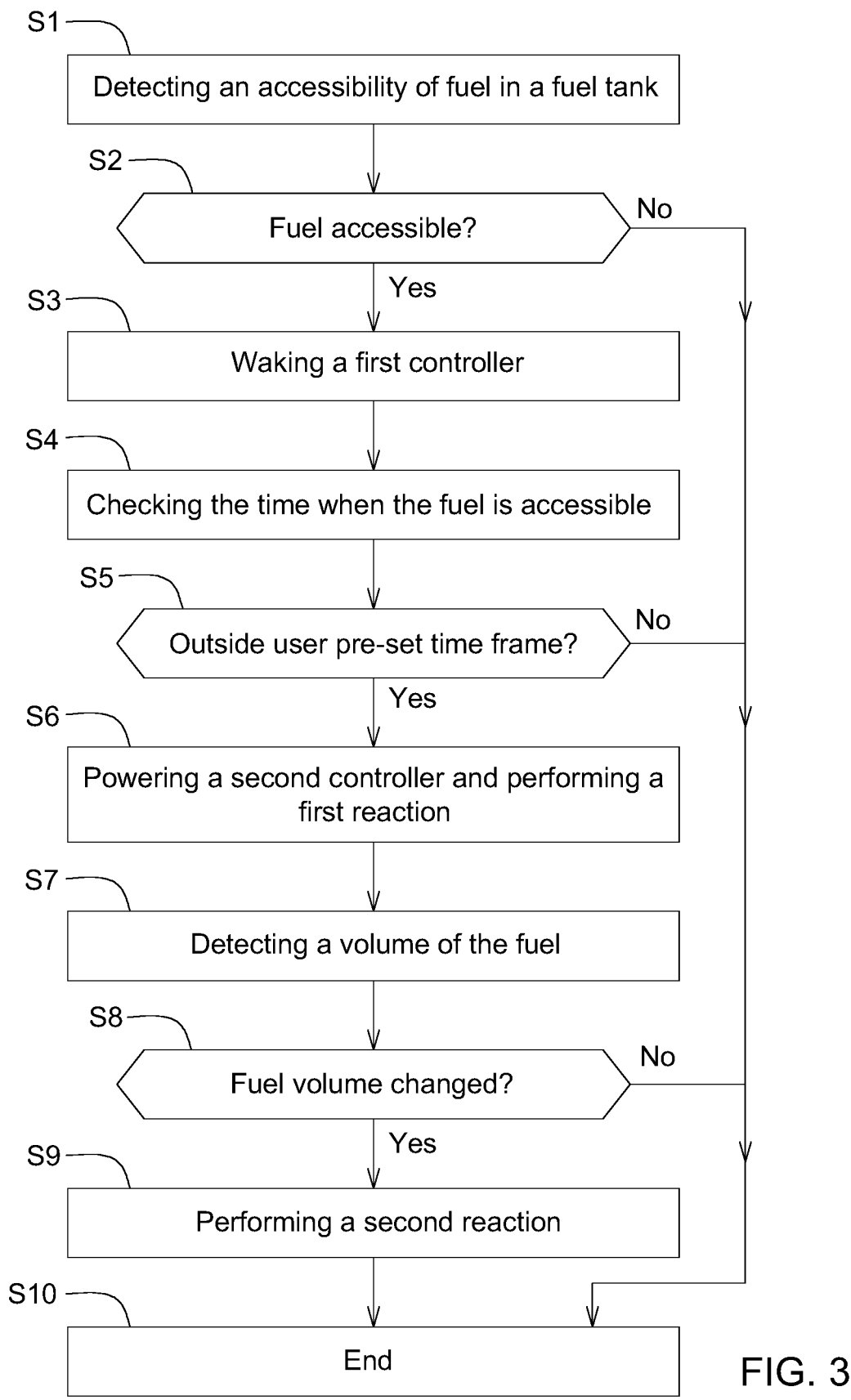
FIG. 3 is a flowchart of a method for fuel theft detection and alert for a work vehicle.

The disclosure also includes a method for fuel theft detection and alert applied on a work vehicle to form a fuel anti-theft system. FIG. 3 illustrates the method.

S1: Detecting an accessibility of fuel in a fuel tank of the work vehicle by a fuel access detection device.

S2: If fuel is accessible, a first signal indicative of the accessibility of the fuel transmitted by the fuel access detection device will be received by a control module. In this embodiment, the first signal is received by a first controller of the control module.

S3: Waking up the first controller of the control module by the first signal.

S4: Checking the time when the fuel is accessible. This may include checking the time the first signal is created by the fuel access detection device or received by the first controller.

S5: Outside user pre-set time frame? If yes, go to S6; if no, go to S10.

S6: Powering a second controller, and performing a first reaction by an alert module of a reaction assembly which is commanded by the first controller based on the first signal. The first reaction includes transmitting an alerting signal notifying a user of the work vehicle that the fuel is accessible.

S7: Detecting a volume of the fuel by a fuel level sensor.

S8: Fuel volume changed? If yes, go to S9; if no, go to S10.

S9: If the fuel volume is changed, performing a second reaction by the reaction assembly which is commanded by at least one of the first and second controllers. The second reaction includes at least one of transmitting another alerting signal by the alert module notifying the user of the work vehicle that the volume of the fuel is changed, providing at least one of a sound by a horn and/or reverse alarm, providing light by lights/bulbs, and recording objects around the work vehicle on a bird's eye image by camera or video recorder. Providing light and recording objects may be performed concurrently to create a better recording.

In this step, the alert module, the horn, and/or reverse alarm are commanded by the first controller. The lights and camera (or video recorder) are commanded by the second controller.

S10: End. The system powers down.

The first controller is woken up prior to the second controller to control the element such as the alert module to save energy because the first controller's command is sufficient for the first reaction unless the fuel is drained. It is possible that the fuel access detection device detects the fuel accessibility changed if the fuel door is not tightly closed or fuel cap is not tightly push/twisted. The temperature or wind may also lead to the fuel accessibility changed. The second controller is powered, operating alone or cooperating with the first controller to accomplish the second reaction. Checking whether the first signal is created or received outside the pre-set time frame avoids the alert and alarm modules being inadvertently triggered.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A work vehicle, comprising:
   a fuel tank for storing a fuel;
   a first controller;
   a second controller;
   a fuel access detection device configured to detect the accessibility of the fuel, and to transmit a first signal indicative of the accessibility of the fuel to the first controller;
   a fuel level sensor configured to detect a volume of the fuel, and to transmit a second signal related to the volume of the fuel to the first controller;
   an input device coupled to the first controller and configured to set up a time frame;
   a reaction assembly coupled to the primary first controller and second controller and performing a first reaction and a second reaction after the first reaction, in the first reaction the reaction assembly commanded by the first controller based on the first signal, and in the second reaction the reaction assembly commanded by at least one of the first controller and the second controller based on the second signal when the volume of the fuel is changed; and
   wherein the second controller is coupled to the first controller and at least partially commands the reaction assembly in the second reaction, the first controller is woken by the first signal, and the first controller powers the second controller when the first signal is received outside the time frame;
   wherein the first controller is a vehicle controller and the second controller is a cab controller.

2. The work vehicle of claim 1, wherein the reaction assembly comprises a transceiver, and in the first reaction the transceiver transmits an alerting signal notifying a user of the work vehicle that the fuel is accessible.

3. The work vehicle of claim 2, wherein in the second reaction the transceiver transmits another alerting signal notifying the user of the work vehicle that the volume of the fuel reduced.

4. The work vehicle of claim 1, wherein the reaction assembly comprises at least one of a horn and a light, and in the second reaction at least one of the horn provides sound and the light provides lighting.

5. The work vehicle of claim 4, wherein the reaction assembly comprises at least one of the horn, a reverse alarm, and the light.

6. The work vehicle of claim 5, wherein the first controller receives the first signal and the second signal, and the first controller is coupled to at least one of the horn and the reverse alarm for commanding at least one of the horn and the reverse alarm in the second reaction.

7. The work vehicle of claim 6, wherein the second controller is coupled to the first controller and the light, and the second controller commands the light in the second reaction.

8. The work vehicle of claim 1, wherein the reaction assembly comprises a bird's eye camera that records objects around the work vehicle.

9. The work vehicle of claim 1, wherein the fuel access detection device comprises a fuel door switch positioned adjacent to a fuel door of the work vehicle, and the fuel door switch is triggered to transmit the first signal to the first controller when the fuel door is opened.

10. The work vehicle of claim 1, wherein the fuel access detection device comprises a fuel cap secured on an opening coupled to the fuel tank, and the fuel cap is triggered to transmit the first signal to the first controller when the fuel cap is removed from the opening.

11. A fuel anti-theft system for a work vehicle, comprising:
    a notifying device positioned in proximity to a user;

the work vehicle configured to communicate with the notifying device, comprising:

a fuel tank for storing a fuel;

a first controller;

a second controller;

a fuel access detection device configured to detect the accessibility of the fuel, and to transmit a first signal indicative of the accessibility of the fuel to the first controller;

a fuel level sensor configured to detect a volume of the fuel, and to transmit a second signal related to the volume of the fuel to the first controller; and a reaction assembly coupled to the first controller and the second controller and performing a first reaction and a second reaction after the first reaction, in the first reaction the reaction assembly commanded by the first controller based on the first signal and the first reaction comprising transmitting an alerting signal to the notifying device, and in the second reaction the reaction assembly commanded by at least one of the first controller and the second controller based on the second signal when the volume of the fuel is changed, and the second reaction comprising transmitting another alerting signal to the notifying device and providing at least one of sound and lighting;

wherein the first controller is a vehicle controller and the second controller is a cab controller.

12. The fuel anti-theft system of claim 11, wherein the first controller commands the reaction assembly at least in the first reaction, and the second controller is coupled to the first controller and at least partially commands the reaction assembly in the second reaction, the first controller is woken by the first signal, and the first controller powers the second controller when the first signal is received outside a pre-set time frame.

13. A method for fuel theft detection and alert for a work vehicle, comprising:

detecting an accessibility of fuel in a fuel tank of the work vehicle by a fuel access detection device;

receiving a first signal indicative of the accessibility of fuel by a first controller when the fuel is accessible;

commanding a reaction assembly to perform a first reaction by the first controller based on the first signal;

waking the first controller after receiving the first signal, the first controller configured to command the reaction assembly at least in the first reaction;

checking the time the first signal is received;

powering a second controller when the time of the first signal is received outside a pre-set time frame, the second controller configured to at least partially command the reaction assembly in a second reaction;

detecting a volume of the fuel by a fuel level sensor;

receiving a second signal related to the volume of the fuel by the first controller;

determining the volume of the fuel change based on the second signal; and commanding the reaction assembly to perform the second reaction by at least one of the first controller and second controller when the volume of the fuel is changed;

wherein the first controller is a vehicle controller and the second controller is a cab controller.

14. The method of claim 13, the first reaction comprising:

transmitting an alerting signal notifying a user of the work vehicle that the fuel is accessible.

15. The method of claim 13, the second reaction comprising:

transmitting an alerting signal notifying a user of the work vehicle that the volume of the fuel is changed.

16. The method of claim 13, the second reaction comprising:

providing at least one of sound and lighting.

17. The method of claim 13, the second reaction comprising:

recording objects around the work vehicle as a bird's eye image using a bird's eye camera.

18. The method of claim 13, comprising:

recording the time of when at least one of the first and second signals are received.

* * * * *